United States Patent
Sadanandan (10) Patent No.: US 9,804,966 B1
(45) Date of Patent: Oct. 31, 2017

(54) METHODS AND APPARATUS FOR CONTENT-BASED STORAGE ADDRESSING WITH DATA PRIORITIZATION

(71) Applicant: EMC CORPORATION, Hopkinton, MA (US)

(72) Inventor: Sandeep Sadanandan, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 86 days.

(21) Appl. No.: 15/083,662

(22) Filed: Mar. 29, 2016

(51) Int. Cl.
 *G06F 12/08* (2016.01)
 *G06F 12/0862* (2016.01)
 *G06F 12/0877* (2016.01)

(52) U.S. Cl.
 CPC ...... *G06F 12/0862* (2013.01); *G06F 12/0877* (2013.01); *G06F 2212/6024* (2013.01)

(58) Field of Classification Search
 None
 See application file for complete search history.

(56) References Cited

U.S. PATENT DOCUMENTS

| 8,429,346 B1 | 4/2013 | Chen et al. |
| 9,104,326 B2 | 8/2015 | Frank et al. |

*Primary Examiner* — Kevin Verbrugge
(74) *Attorney, Agent, or Firm* — Daly, Crowley, Mofford & Durkee, LLP (57) ABSTRACT

Methods and apparatus to determine priority information from read and/or write access of data blocks with addressing to physical storage based upon unique identifiers derived from content of data blocks. Time information for the respective data blocks can be stored. In embodiments, data blocks can be moved and/or copied based upon the priority information.

20 Claims, 11 Drawing Sheets

Until 09:03 AM: 400

| Content Fingerprint | Reference | Access | Timer (Secs) | Timestamp | Priority |
|---|---|---|---|---|---|
| 20147A8 | 1 | 5 | 5 | 01/02/16 09:00 | 5 |
| AB45CB7 | 10 | 45 | 5 | 01/02/16 09:01 | 1 |
| F3AFBA3 | 7 | 30 | 5 | 01/02/16 09:01 | 2 |
| 963FE7B | 6 | 20 | 5 | 01/02/16 09:02 | 3 |
| 20147A8 | 2 | 6 | 5 | 01/02/16 09:02 | 4 |
| AB45CB7 | 10 | 50 | 5 | 01/02/16 09:03 | 1 |

*FIG. 4A*

Until 09:04 AM: 400'

| Content Fingerprint | Reference | Access | Timer (Secs) | Timestamp | Priority |
|---|---|---|---|---|---|
| 20147A8 | 1 | 5 | 5 | 01/02/16 09:00 | 5 |
| AB45CB7 | 10 | 45 | 5 | 01/02/16 09:01 | 2 |
| F3AFBA3 | 7 | 30 | 5 | 01/02/16 09:01 | 1 |
| 963FE7B | 6 | 20 | 5 | 01/02/16 09:02 | 3 |
| 20147A8 | 2 | 6 | 5 | 01/02/16 09:02 | 4 |
| AB45CB7 | 10 | 50 | 5 | 01/02/16 09:03 | 2 |
| F3AFBA3 | 11 | 60 | 5 | 01/02/16 09:04 | 1 |

*FIG. 4B*

| Fingerprint 500 | Reference 502 | Access (Read/Write) 504 | | |
|---|---|---|---|---|
| | | Parent 506 (Daily/Weekly..Lifetime) | Child1 508 (1st hour) | Child2 510 (2nd hour) |
| 20147A8 | 5 | 5 | 2 | 3 |
| AB45CB7 | 10 | 50 | 40 | 10 |
| F3AFBA3 | 40 | 90 | 30 | 60 |
| 963FE7B | 100 | 60 | 30 | 30 |
| 20147A8 | 70 | 110 | 40 | 70 |
| ⁘ | | | | |

FIG. 5A

| Reference Count Range 522 | Class Value 520 |
|---|---|
| 1 to 10 | 1 |
| 11 th 99 | 2 |
| >100 | 3 |
| ⁘ | |

FIG. 5B

| 600 Fingerprint | 602 Reference | 604 Reference Class Value (RCV) | Access Counter (Read/Write) | | | 612 Average of C1 & C2 (AVGC): AVGC = (C1+C2)/2 | 614 Priority (PRI) PRI = RCV * AVGC |
|---|---|---|---|---|---|---|---|
| | | | 606 Parent (P) | 608 Child1 (C1) | 610 Child2 (C2) | | |
| 20147A8 | 5 | 1 | 5 | 2 | 3 | 2.5 | 2.5 |
| AB45CB7 | 10 | 1 | 50 | 40 | 10 | 25 | 25 |
| F3AFBA3 | 40 | 2 | 90 | 30 | 60 | 45 | 90 |
| 963FE7B | 100 | 3 | 60 | 30 | 30 | 30 | 90 |
| 20147A8 | 70 | 2 | 110 | 40 | 70 | 55 | 110 |
| • • | | | | | | | |

# METHODS AND APPARATUS FOR CONTENT-BASED STORAGE ADDRESSING WITH DATA PRIORITIZATION

BACKGROUND

Storage systems may use block-based storage for storing data. Data block addresses may be generated from data content. As the costs of solid-state memory decrease, organizations can consider using systems that can store and process terabytes of data.

SUMMARY

Embodiments of the disclosure may prioritize data blocks based on read and/or write access of the data blocks in a storage array. In embodiments, access-based priority information can be generated based on read and/or write operations, access interval information, and/or historical access information. The generated priorities for the data blocks may be used in a variety of ways. For example, after a disk failure when the data is being rebuilt, a storage array can give preference to the highest priority data for movement to the new space. In embodiments, data blocks can be moved to cache based upon the priority information and/or historical time-of-day based access.

In one aspect, a method may include receiving read and write commands having addressing to physical storage based upon unique identifiers derived from content of data blocks associated with the write and read commands; modifying access information for the respective data blocks associated with each of the read commands; modifying write reference information for respective data blocks associated with each of the write commands; storing time information for the respective data blocks; determining respective priority information for the data blocks from the access information, the write reference information; and the time information; and manipulating the data in the data blocks based upon the priority information for the data blocks.

An example method may include one or more of the following features: associating timestamp information with the data blocks, moving ones of the data blocks to cache memory based upon the priority information of the data blocks, moving ones of the data blocks to the cache memory based upon the priority information and the timestamp information associated with the data blocks, moving data from ones of the data blocks to rebuild a disk based upon the priority information, moving data from ones of the data blocks for replication based the priority information, associating timestamp information with the data blocks and moving ones of the data blocks to cache memory based upon the priority information and historical time-of-day based access, the time information includes time interval information, modifying the access information for an associated data block if the time interval for the associated data block expires, modifying the write reference information for data deduplication for at least one of the write commands, weighting the access information, the write reference information; and/or the time information, and/or modifying the access information for the respective data blocks associated with each of the write commands.

In another aspect, an article may include a non-transitory computer-readable medium having stored instructions that enable a machine to: receive read and write commands having addressing to physical storage based upon unique identifiers derived from content of data blocks associated with the write and read commands; modify access information for the respective data blocks associated with each of the read commands; modify write reference information for respective data blocks associated with each of the write commands; store time information for the respective data blocks; determine respective priority information for the data blocks from the access information, the write reference information; and the time information; and manipulate the data in the data blocks based upon the priority information for the data blocks.

An example article may include stored instructions for one or more of the following features: associating timestamp information with the data blocks, moving ones of the data blocks to cache memory based upon the priority information of the data blocks, moving ones of the data blocks to the cache memory based upon the priority information and the timestamp information associated with the data blocks, moving data from ones of the data blocks to rebuild a disk based upon the priority information, moving data from ones of the data blocks for replication based the priority information, associating timestamp information with the data blocks and moving ones of the data blocks to cache memory based upon the priority information and historical time-of-day based access, the time information includes time interval information, modifying the access information for an associated data block if the time interval for the associated data block expires, modifying the write reference information for data deduplication for at least one of the write commands, weighting the access information, the write reference information; and/or the time information, and/or modifying the access information for the respective data blocks associated with each of the write commands.

In a further aspect, a system can include a processor; and a non-transitory memory having stored instructions that when executed on the processor cause the processor to: receive read and write commands having addressing to physical storage based upon unique identifiers derived from content of data blocks associated with the write and read commands; modify access information for the respective data blocks associated with each of the read commands; modify write reference information for respective data blocks associated with each of the write commands; store time information for the respective data blocks; determine respective priority information for the data blocks from the access information, the write reference information; and the time information; and manipulate the data in the data blocks based upon the priority information for the data blocks.

An example system may include stored instructions than can cause a processor to perform: associating timestamp information with the data blocks, moving ones of the data blocks to cache memory based upon the priority information of the data blocks, moving ones of the data blocks to the cache memory based upon the priority information and the timestamp associated with the data blocks, moving data from ones of the data blocks to rebuild a disk based upon the priority information, moving data from ones of the data blocks for replication based the priority information, associating timestamp information with the data blocks and moving ones of the data blocks to cache memory based upon the priority information and historical time-of-day based access, the time information includes time interval information, modifying the access information for an associated data block if the time interval for the associated data block expires, modifying the write reference information for data deduplication for at least one of the write commands, weighting the access information, the write reference information; and/or the time information, and/or modifying the access information for the respective data blocks associated with each of the write commands.

BRIEF DESCRIPTION OF THE DRAWINGS

The foregoing features of this invention, as well as the invention itself, may be more fully understood from the following description of the drawings in which.

DETAILED DESCRIPTION

Figure 1:
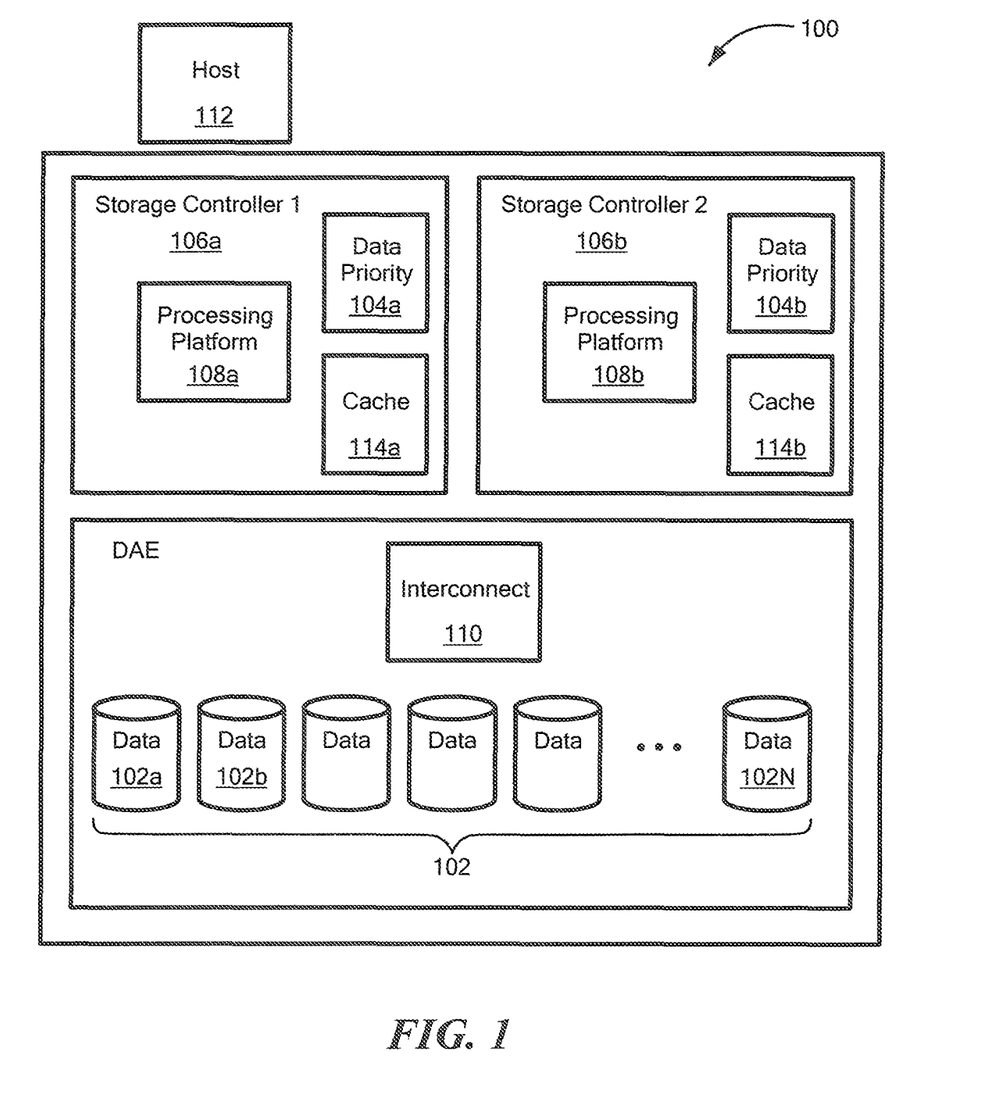
FIG. 1 is a block diagram illustrating a system according to an example embodiment of the disclosure.

FIG. 1 shows an illustrative data storage system 100 that may have data access-based prioritization in accordance with embodiments of the disclosure. In embodiments, the data storage system 100 can distribute data blocks in storage devices 102a-N (referred to herein generally as storage 102) by generating a unique identifier for each data block based on the content of the data block. For example, a hash value can be generated from the data in the data block to provide the unique identifier. As described more fully below, information corresponding to access operations for the data blocks can be used by a data priority system (e.g., data priority systems 104a,b of FIG. 1 (referred to herein generally as data priority system 104)) to provide data prioritization that can be used in a variety of ways, such as time-based placement of data blocks in cache, data block ordering for disk rebuilds, replication, and the like.

In embodiments, the data storage system 100 may include first and second storage controllers 106a,b that can include respective processing platforms 108a,b with processing and memory resources. One or more interconnect systems 110 can provide access to the storage 102. In embodiments, storage 102 can be provided as solid state drives (SSDs), which can be FLASH-based memory, for example.

It is understood that any practical number of storage devices 102, storage controllers, processing platforms, processors, ports, interconnect components and the like can be used to meet the needs of a particular application. For example, a single storage controller can be used.

In embodiments, the storage devices 102 can be provided in a disk array enclosure (DAE), and the storage controllers 106a,b may communicate with the attached DAE via an interconnect(s) 110. Regardless of which storage controller 106a,b receives an I/O request from a host 112, the storage controllers 106a,b may cooperate to process the request. In embodiments, the system may ensure that components share the load and participate generally evenly in I/O operations.

In embodiments, the data storage system 100 may deduplicate data, e.g., store a unique data block only once, as the system processes the data in blocks of 4K, 8K or other desired size. The system 100 may include a global memory cache, which may be aware of the deduplicated data, and content-based distribution that spreads the data evenly across the entire array. In embodiments, the first storage controller 106a may include first cache memory 114a and the second storage controller 106b may include second cache memory 114b. It is understood that the global cache may span the cache memory 114a,b of the storage controllers 106a,b with cached data in one local cache being available via interconnects, etc., to other storage controllers.

Figure 2A:
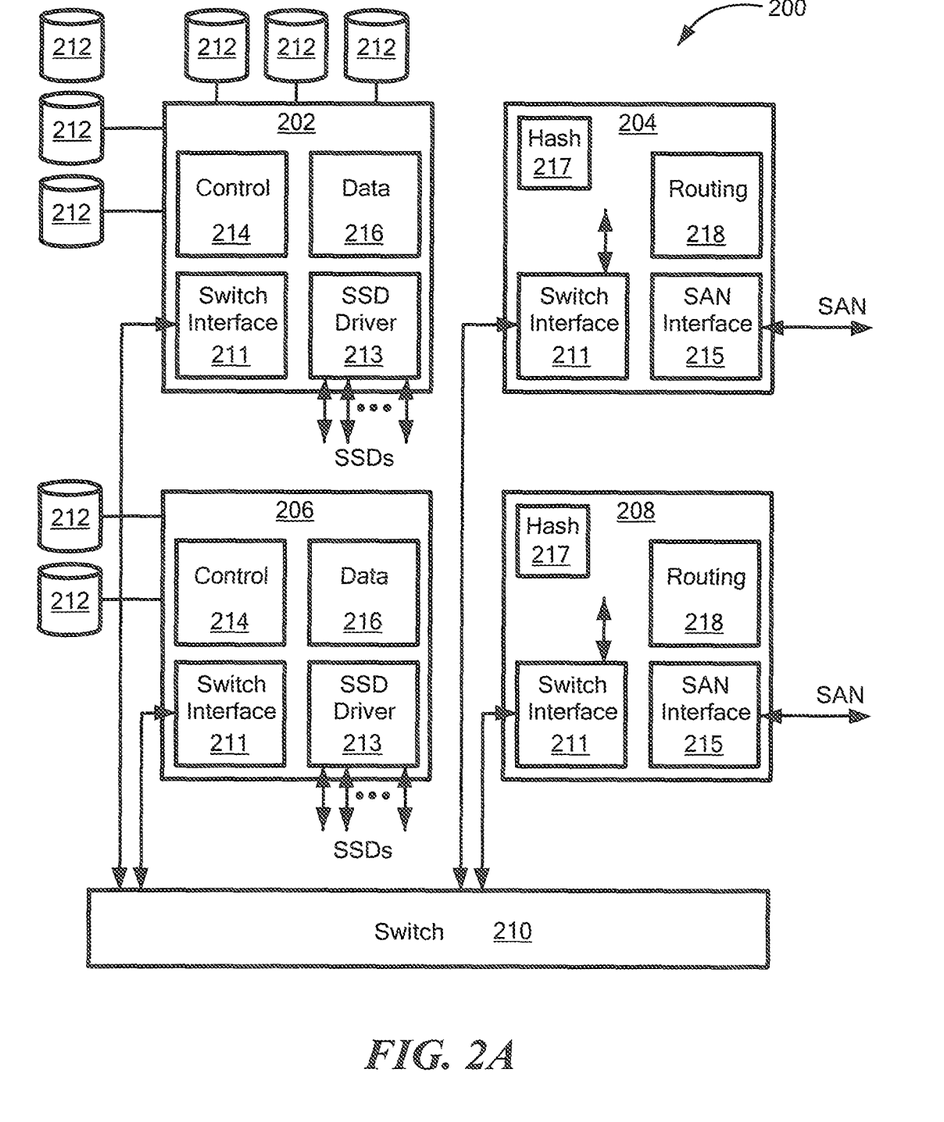
FIG. 2A is a block diagram illustrating a node-based system according to an example embodiment of the disclosure.

FIG. 2A shows an illustrative node-based data storage system 200 that may have access-based data prioritization in accordance with embodiments of the disclosure. In embodiments, a node can include one or more systems of the same or different type to meet the needs of a particular application. Illustrative nodes can include routing systems, control systems, data systems, and hash systems. Embodiments can include any practical number of nodes and systems.

In the illustrated embodiment, first, second, third, and fourth nodes 202, 204, 206, 208 can be interconnected by a switch 210 via a switch interface 211. The first node 202 can include a control system 214 and a data system 216. In embodiments, separate data and control planes may be provided by the control and data systems 214, 216. The control system 214 may control execution of read and write commands to the storage devices 212. The data systems 216 may be connected to the storage devices 212 and, under control of a respective control system 214, may pass data to and/or from the storage devices via suitable storage drivers 213.

The data and/or control systems 214, 216 may retain extracts of the data stored in the storage devices 212. In embodiments, the data extracts may be generated by cryptographic hashing of the data content in the data blocks. In embodiments, the extracts may be used for content addressing of the data blocks to the physical storage devices 212.

The second node 204 can include a hash system 217 to generate the hash/extract, which can be referred to as a content fingerprint for the data blocks. The second node 204 can also include a routing system 218, along with a switch interface 211 and a SAN interface 215. The routing system 218 may terminate storage and retrieval operations and distribute commands to control systems 214 that may be selected for the operation in such a way as to retain balanced usage within the system.

In the illustrated embodiment, the third node 206 can be similar to the first node 202 and the fourth node 208 can be similar to the second node 208.

The routing systems 218 may use the hash values calculated from data blocks to select control systems 214 for distribution. More particularly, selection of the control system 214 may use hash values, or may rely on the user address and not on the content (hash). The hash value may, however, be used for selecting the data system 216, and for setting the physical location for data storage within the data system.

In some examples, the system 200 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 2B:
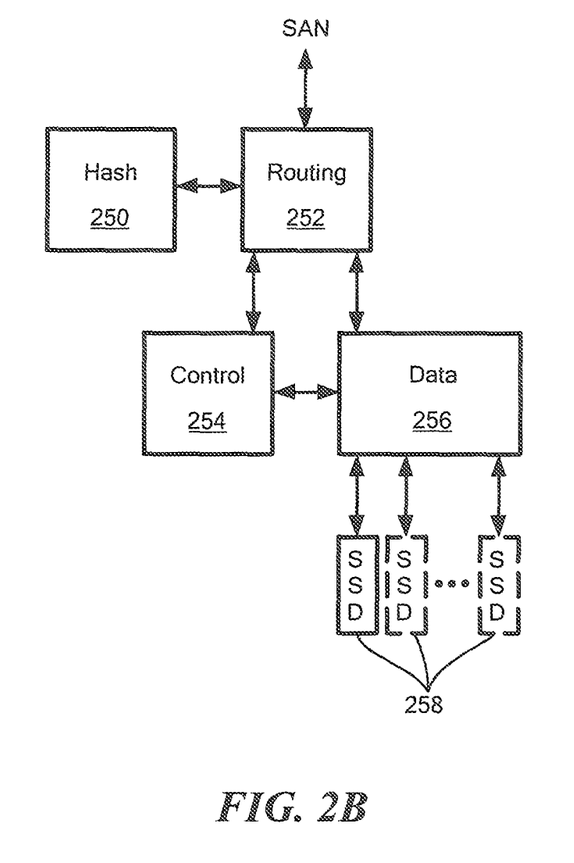
FIG. 2B is a block diagram illustrating further detail of the node-based system of FIG. 2A according to an example embodiment of the disclosure.

FIG. 2B is an example of a system that can include a hash system 250 communicatively coupled to a routing system 252, which can be communicatively coupled to a control system 254 and a data system 256. The data system 256 can be communicatively coupled to any practical number of memory devices 258. The routing system 252 can route read/write commands from a host (not shown) to control and data systems 254, 256 for execution. In embodiments, the data content-based mapping to physical storage 258 can distribute workload relatively evenly and provide separation of the control and data paths. Read and write operations to the SSDs 258 can be used to generate priority values for the data blocks, as described more fully below.

Figure 2C:
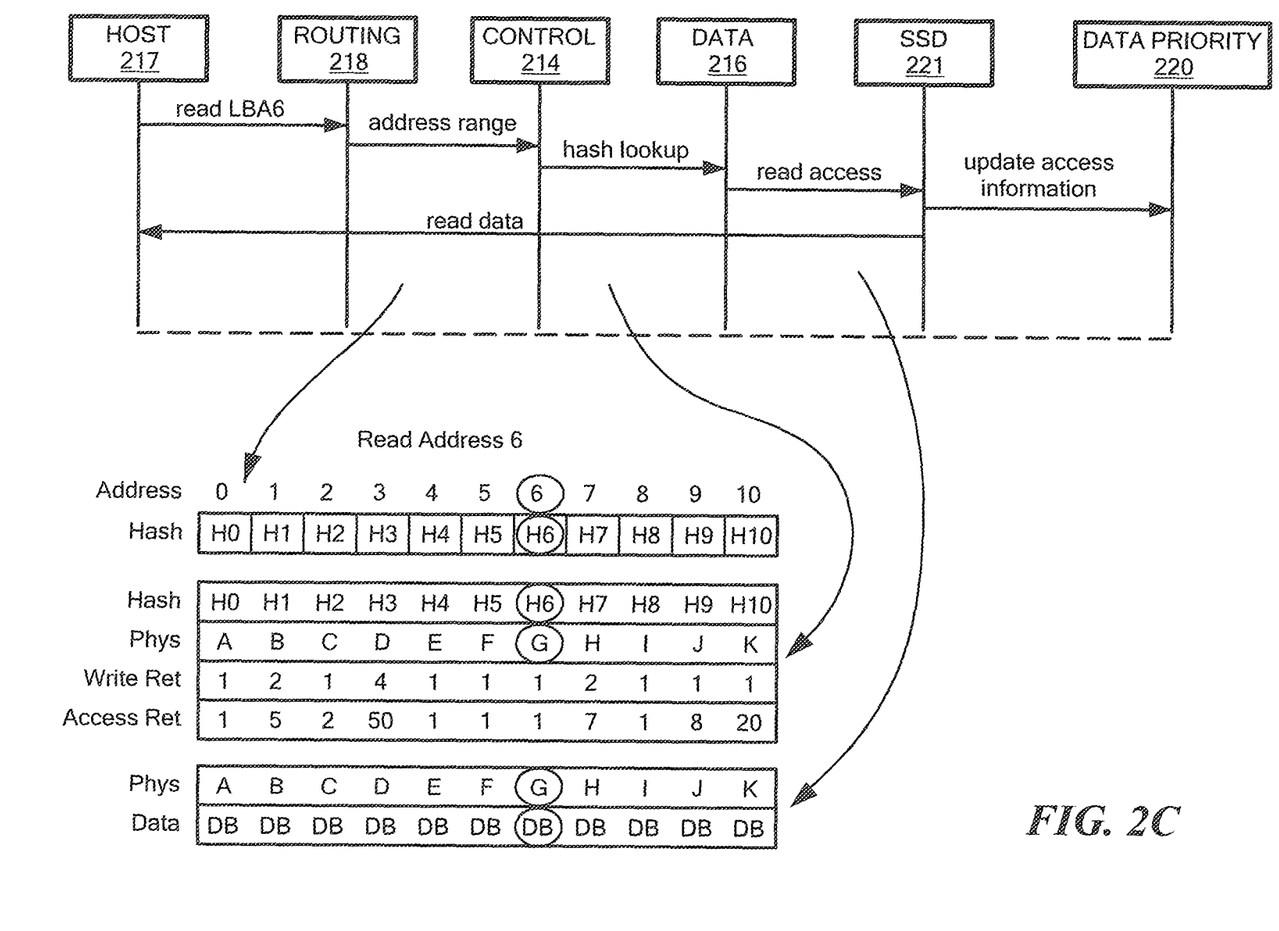
FIG. 2C shows an example IO operation for a system having data priority information in accordance with an example embodiment of the disclosure.

FIG. 2C shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access. A data priority manager 220 can use the write reference information and/or access reference information to generate priority values for the data blocks.

For a write operation from a host, the routing system 218 can receive the write data and can segment the data stream into data blocks, and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented, If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3A:
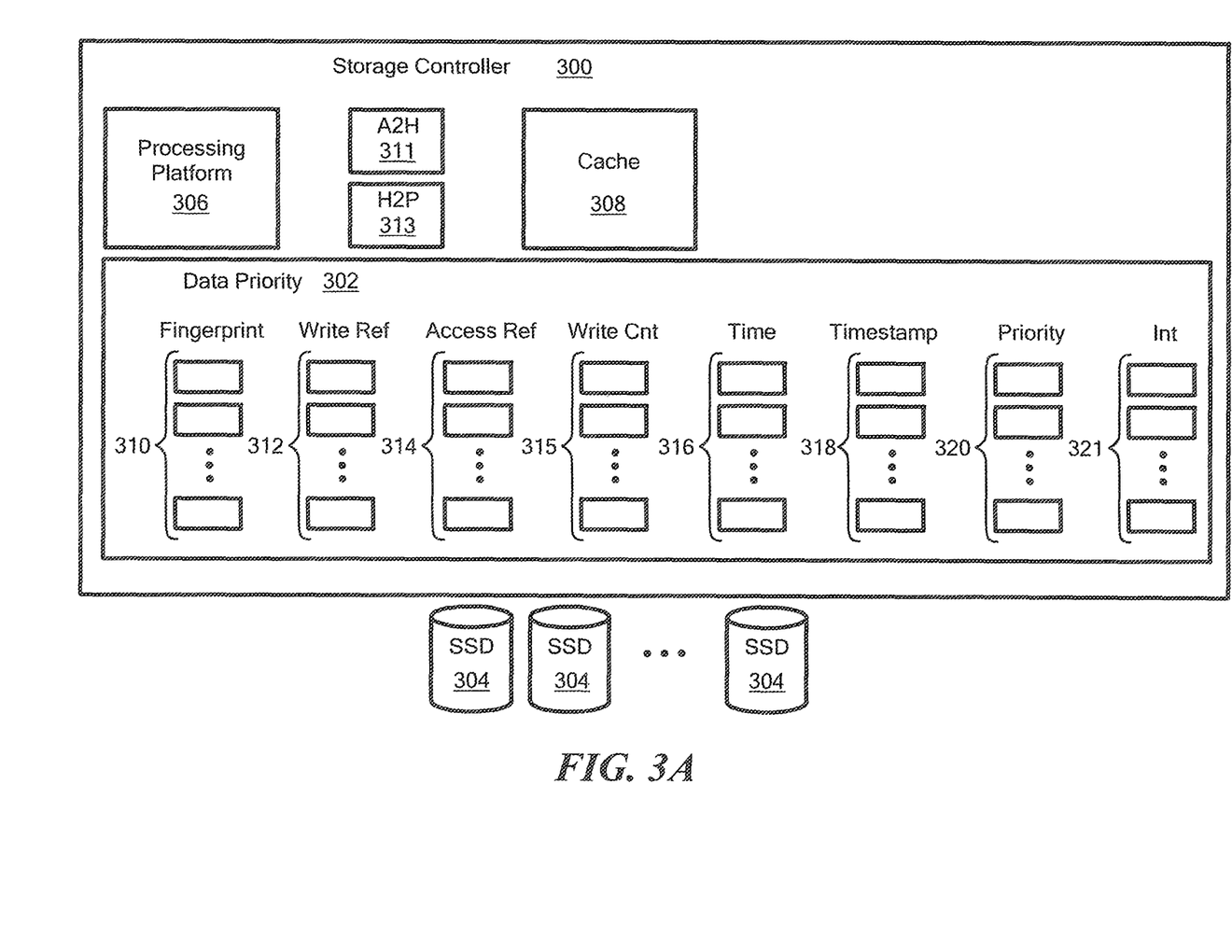
FIG. 3A is a block diagram illustrating data priority information for a system according to an example embodiment of the disclosure.

FIG. 3A shows an illustrative storage controller 300, which can be provided as storage controller 106a in FIG. 1, having a data priority system 302 that can prioritize data in physical storage, such as storage devices 304. As described above, the storage controller 300 can include a processing platform 306 that may include resources, such as a processor and memory under the control of an operating system, e.g., LINUX. The storage controller 300 can also include cache memory 308 that can form part of a global cache.

In an embodiment, the data priority system 302 can include content fingerprint information 310, write reference information 312, access information (e.g., read or write access) 314, write count 315, time information 316, and/or timestamp information 318. It is understood that the content fingerprint 310, write reference information, 312 etc., can be determined in the data priority system 302 or by other systems in the storage controller 300 and/or data storage system. In embodiments, the write count 315 can correspond to the total number of deduplications for a particular data block. In embodiments, the write count 315 may not be reset and/or reinitialized. The write count 315 may track and maintain a number of deduplications for a data block over the lifetime of that data block. That is, as a host write is received the storage system may determine that a certain data block is not unique. The data priority system 302 may increment the value of the write reference information 312, access information 314, and/or write count 315. In embodiments, the write reference information 312 and the access information 314 may be reset or reinitialized over time, while the write count 315 is not reset/reinitialized. In embodiments, the write count 315 may be decremented only when a data block's associated deduplication entry is removed/deleted. Since the write count 315 may maintain a total number of deduplications for a data block, the data priority system 302 may have a summary of the relative importance of the data blocks. In embodiments, the write count 315 can be used in combination with the access information 314 and the write reference information 312 to calculate the importance/priority of the data block.

As noted above, a unique identifier can be generated for each data block. In general, any practical mechanism can be used to generate the unique identifier, which can be referred to as the content fingerprint 310. In embodiments, a cryptographic hash function can be used to generate the content fingerprint 310. It is understood that the term content fingerprint may not be limited to hash values.

The data priority manager 302 can generate and/or store a host logical block address (LBA), as shown in Table 1 below, for each data block along with a map to the content fingerprint 310 and the location in physical memory, e.g., SSD location. It will be appreciated that this arrangement may allow the system to distribute the data evenly across the array and place each block in suitable locations on the SSDs. It is understood that Table 1 includes example values.

TABLE 1

| LBA Offset | Physical Location (Offset) | Content Fingerprint | Write Reference | Access Ref- Read/Write | Timer (Secs) | Timestamp | Priority |
|---|---|---|---|---|---|---|---|
| Address 0 | 40 | 20147A8 | 1 | 5 | 5 | 01/02/16 09:00 | 5 |
| Address 1 | 8 | AB45CB7 | 10 | 45 | 5 | 01/02/16 09:01 | 1 |
| Address 2 | 88 | F3AFBA3 | 7 | 30 | 5 | 01/02/16 09:01 | 2 |
| Address 3 | 24 | 963FE7B | 6 | 20 | 5 | 01/02/16 09:02 | 3 |
| Address 4 | 64 | 20147A8 | 2 | 6 | 5 | 01/02/16 09:02 | 4 |
| Address 5 | 128 | AB45CB7 | 10 | 50 | 5 | 01/02/16 09:03 | 1 |

In embodiments, for an example write operation, an incoming data stream may reach an active storage controller 300 that breaks the stream into blocks of 4K, for example. For every 4 KB block, a content fingerprint 310 is generated. The priority manager 302 may maintain the content fingerprint 310 information, which can be used to determine the storage location of the data. The LBA to content fingerprint mapping can be stored as described above.

The system checks if the content fingerprint 310, and the corresponding block, have already been stored previously. If the content fingerprint 310 is new, the system can choose a location in storage 304 for the block based upon the content fingerprint and can generate a content fingerprint to physical location mapping.

In embodiments, the data priority manager 302 can increment the write reference information 312 for the content fingerprint for each write operation for the data block corresponding to the content fingerprint. The write to storage 304 can then be performed.

In embodiments, the actual write of the data block to physical storage 304 is carried out asynchronously. At the time of the write, the system may place the data block into a write buffer and return an acknowledgement to the host. In embodiments, when a given number of data blocks are collected in a buffer, the system can write the data blocks to stripe(s) on physical storage 304.

In case of a "duplicate" write, the storage controller 300 records the new LBA to fingerprint mapping, and can increment the write reference count 312 and the write count 315 on this specific content fingerprint. Since the data already exists in physical storage 304, it may not be necessary to change the content fingerprint 310 to physical location mapping or to write the non-unique data block to storage 304. The deduplicated write operation may be carried out faster than the first unique block write.

In a data block read operation, the storage controller 300 can perform a look-up of the logical address in the LBA to fingerprint mapping. Once the content fingerprint 310 is found, the storage controller can look up the content fingerprint to physical mapping, and retrieve the data block from the physical storage location. In embodiments, an A2H mapping 311 and a H2P mapping 313 can be used to access data in a manner that may be similar to that described in FIG. 2C. Where the data is evenly written across storage devices, the read load may also be evenly shared. The retrieved data can be sent to the requesting host. In embodiments, the access reference information 314 for the content fingerprint 310 can be incremented. In embodiments, the access reference information 314 can be incremented for read and write operations, which can include writes and deduplicated writes.

In embodiments, information relating to read, write, and/or data deduplication can be contained in separate or combined locations. For example, a total of read and write operations can be maintained from which write operations can be subtracted to determine read operations. Various embodiments will be readily apparent to one of ordinary skill in the art without departing from the scope of the present invention.

In embodiments, the storage controller 300 cache 308 may be provided as a read cache, which can be organized by content fingerprint. Blocks whose contents (represented by their content fingerprints 310) are more likely to be read can be placed in the cache rendering the read cache deduplication aware.

In embodiments, the time information 316 can be associated with the write reference information 312 and/or the access reference information 314. For example, if a data block is not read and/or written to within a time interval contained in the time information 316 for the data block, then the write reference information 312 and/or the access reference information 314 can be decremented, reset, or otherwise adjusted. In one particular example, if a data block is not accessed for five seconds, as shown in Table 1, the access information 314 for the data block is reset to zero.

In embodiments, the timestamp information 318, which can be stored for each read and/or write operation for a given data block, can be used to analyze historical and/or time trends. In other embodiments, current information associated with the content fingerprint 310 is saved at certain time intervals that can have an associated timestamp 318. As described more fully below, the timestamp information 318 can be used to move data to cache 308 based upon historical time-of-day access information.

In embodiments, one or more of the write reference information 312, access reference information 314, time information 316, and/or timestamp information 318 can be processed to generate a ranking/priority 320 for the data. For example, one or more of the write reference information 312, access reference information 314, time information 316, timestamp information 318, and/or ranking/priority 320 can be used to analyze trends and access patterns on an hourly, daily, weekly and/or monthly basis, for example. In embodiments, placement of data blocks in cache memory 308 can be controlled at least in part based upon historical time-based usage. Data blocks that are accessed relatively often at a particular time or time range can be moved to cache in advance of the particular time to improve cache hit ratios (The percentage of data block accesses that result in cache hits may be known as the hit rate or hit ratio of the cache). This can be considered pre-fetch for time-based historical access information.

Figure 3B:
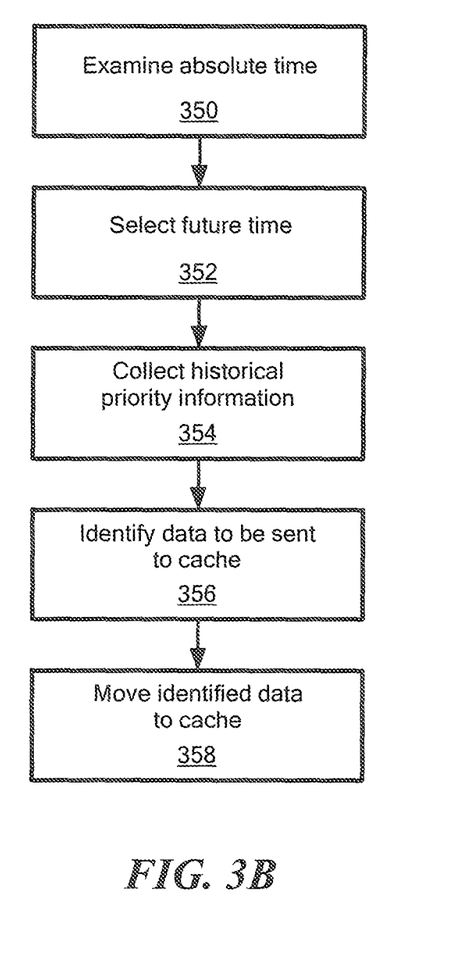
FIG. 3B is an example process that can identify data for movement to cache before some future time based on past priority information.

FIG. 3B shows an example process that can pre-fetch data for cache based upon historical access and/or priority information. In step 350, the system may examine absolute time and in step 352 the system may select a future time that can have some relation to the examined absolute time. As used herein, the term "absolute time" may relate to local time, such as Eastern Standard Time (EST), which references Coordinated Universal Time (UTC), i.e., the time standard that forms the basis for civil time and time zones worldwide. For example, the system may select a time five seconds from the current absolute time. For example, the future time may be 1:00:05 pm, which is five seconds from 1:00:00 pm. In step 354, the system can collect priority information associated with the 1:00:05 pm future time on some basis of time. For example, the system can collect priority information for data blocks at the future time 1:00:05 pm for the past week. In step 356, the system can identify the data having the highest average priority at 1:00:05 pm over the past week, for example. The system may provide some amount of data that can be moved to cache in advance of the future time. The data having the highest average priorities that fits within the allocated amount of data can be moved to cache in step 358 in advance of 1:00:05. By moving data into cache based on historical time-based priority information, cache efficiency can be improved.

Referring again to FIG. 3, in embodiments, the data priority manager 302 can analyze trend/relationship information to determine which data block(s) are interlinked. For example, data blocks that form at least a portion of a group of data, such as a video clip, may be considered interlinked. The priority and interlinked data information can be used to place data in cache 308 during a specific time of day, for example. In embodiments, the data block time-based access information can be used to determine an amount of time that certain data blocks should remain in cache.

In embodiments, the data priority manager 302 may observe that a particular high priority data block is regularly used/accessed at a given time based upon timestamp information 318 and generate/update a task to maintain a record of other data blocks that are also accessed relatively often (possibly in the same order) along with the high priority data block for the given time.

The data priority manager 302 can process the data access information (e.g., time of access, comparison to threshold corresponding to a number of times data blocks are accessed, period of time data blocks are accessed together, and/or type of access (read/write)) to determine whether certain data blocks are interrelated/interlinked. In embodiments, a database can contain data access information for data blocks to perform interrelated/interlinked assessments and update the database.

In embodiments, the data priority manager 302 may determine data block priority 320 at least in part from a number of interlinked data blocks. In embodiments, a number 321 of associations/interlinks that a data block has can be represented in terms of ranges/groups, for example. In embodiment, the number 321 of data block associations can be represented in ranges. For example, a number of data block associations ranging from 0-10 may be assigned a value of 1 and so on. The resultant value can then be used in a weighting scheme to calculate the priority 320 of data blocks.

Video streaming and other applications may have IO operations that are sequential in nature. However, storage arrays that store data with unique IDs, such as content fingerprint of the data blocks, may not sequentially store the data. Thus, if the first data block is accessed by a host, in embodiments, the storage system, based on past access patterns, may pre-fetch interrelated data to the cache. After the pre-fetch, the host may have the required data at a given time. In one embodiment, the required data may be cached sequentially. In other embodiments, the required data may be cached non-sequentially In embodiments, data priority information 320 can be used to determine which data blocks should be moved to a different location, such as in the case of disk failure or disk optimization.

In other embodiments, data priority information 320 can be used to move data in priority order for a background copy during replication.

In embodiments, data priority information 320 can be used to provide data after a disk failure, when a disk is about to fail, and/or when a disk is failing. A storage system may evaluate the data priority information 320 to determine which of the data blocks in the failing/failed disk(s) has the highest priority at that time and copy (in case of proactive sparing) or rebuild using parity info from the surviving disks (in case of hot sparing) those data blocks first to the replacement disk. A storage system may run background checks/verifications to determine if a disk/sector may be failing or may be about to fail. In scenarios where the storage system identifies a disk that is failing (or about to fail), as part of proactive sparing (where the data may be copied from the failing disk to a hot spare), the storage system may examine the data priority information 320 and may give preference to the most frequently accessed and/or highest priority data blocks on the failing disk to be copied over to the hot spare. In scenarios where a disk has already failed and the data on the failed disk may need to be rebuilt using the associated parity info on the surviving disks on to a hot spare, the storage system may examine the data priority information 320 and may give preference to the most frequently accessed and/or highest priority data block on the failed disk to facilitate data rebuild on the hot spare.

In embodiments, a storage system can initiate/start a copy process, such as copy on first write, redirect on write, background copy etc. In a priority copy, when a replication session is initiated/established, the data priority manager 302 may see which data blocks in a replication session have high priority values. The highest priority data blocks may be copied/moved first to a target device before the lower priority data blocks.

Figure 4A:
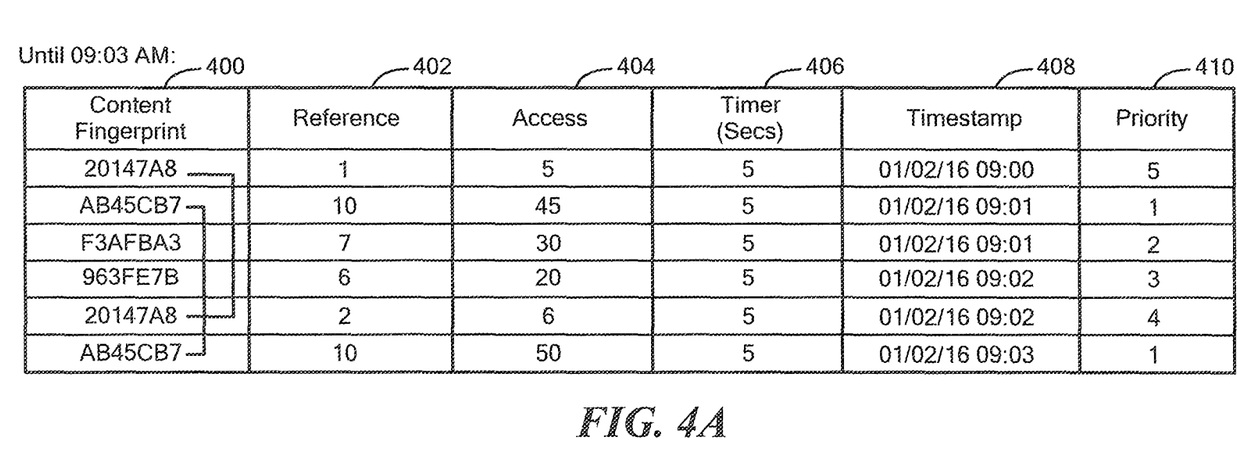
FIG. 4A is a tabular example of data priority information for a system according to an example embodiment of the disclosure.

FIG. 4A shows example data that can be used to generate data priority. In the illustrative example, content fingerprint 400, reference information 402, access information 404, time interval information 406, timestamp information 408, and priority information 410 are shown. For convenience, identical content fingerprints are indicated as shown. The timestamp information 408 is shown in absolute time from 01/02/2016 at 09:00 to 01/02/2016 at 09:03. As can be seen, in general, the content fingerprints 400 having the highest reference and access information 402, 404 have the highest priority 410. For example, content fingerprint AB45CB7 at time stamp 09:03 has the highest priority ("1") where the illustrative priorities 410 range from a highest priority of "1" to a lowest priority of "5."

It is understood that priority values can have any practical range. For example, priority values can range from one to one million, or higher. One of ordinary skill in the art will recognize that priority values can be selected to meet the needs of a particular application without departing from the scope of the invention.

Figure 4B:
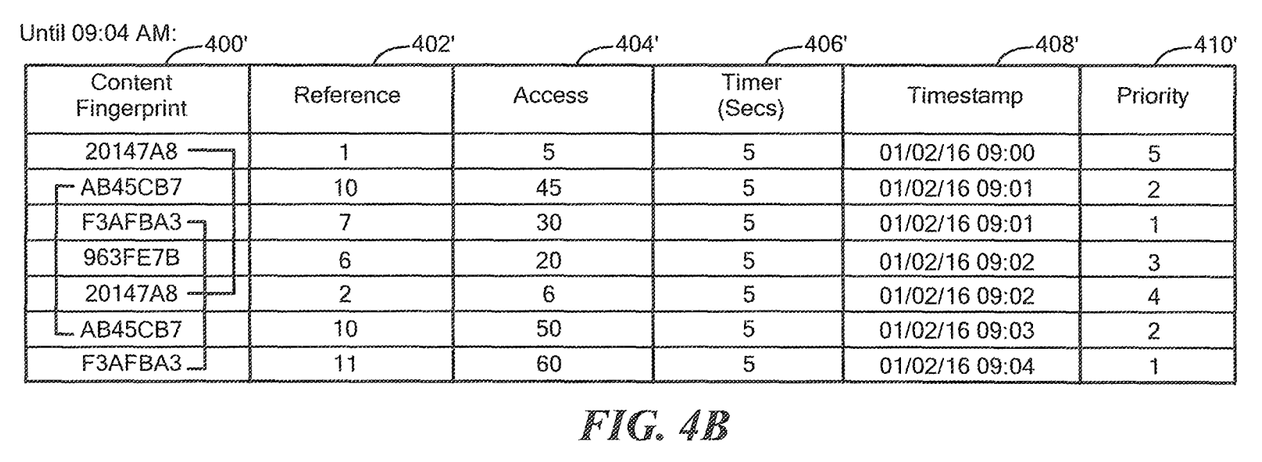
FIG. 4B is a tabular example of data priority information for a system according to an example embodiment of the disclosure.

FIG. 4B shows example data for absolute time from 01/02/2016 at 09:00 to 01/02/2016 at 09:04, i.e., an additional minute over the example data for FIG. 4A. As can be seen, as the reference and access information 402', 404' change over time, the priority 410' of the content fingerprints 400' may also change. For example, content fingerprint AB45CB7 has a priority of "2" at 09:04 as compared to a priority of "1" at 09:03 in FIG. 4A.

It is understood that the reference information 402 and access information 404 can be used in a variety of ways to generate the priority information 410. In one example, the access information 404 is weighted twice as much as the reference information 402.

In embodiments, priority information 410 may be maintained for host/initiator IOs and may not be maintained for storage system initiated IOs, such as replication, migrations etc. In embodiments, an overall read to write ratio for data blocks may be used to plan and/or size a storage system cache capacity for read and/or write, e.g., how much cache can be allocated to read operations (prefetching) vs. write operations at any given time to provide dynamic cache allocation.

In embodiments, a read/write ratio may be used by a storage system in determining types of workloads being performed/expected during a particular time. For example, the workload may be write intensive during most part of the day (production environment) and read intensive during the night (backup operations) and/or combinations thereof. By analyzing read/write ratio and data block priority information 410, in embodiments a storage system can make proactive cache decisions and prepare or dedicate resources for a projected workload.

Also, different applications may have different read/write requirements. For example, an online transaction processing (OLTP) application may be random, small IO, and write intensive, while a video streaming application may be large IO, sequential, and write once/read many. In addition, applications may be more or less active during specific time of day. In embodiments, a storage system may learn trends and vary weighing for write and access values. For example, writes may be weighed twice as much as reads for applications/hosts/requests which are write intensive In embodiments, a 'value' of data may be high/highest when the data is created/new and decrease over time. In embodiments, timers can be set to monitor the access patterns of data blocks. If a particular data block is not accessed and/or has seen reduced activity for a given amount of time, the access/write values for that data block can be decremented by 1 (or any other values based on the length of time it was not accessed). Or an example storage system may maintain a different set of counters which may increment each time a data block is not accessed for the given amount of time. This value may be subtracted from the access/write values before the priority values for that data block are determined.

Figure 5A:
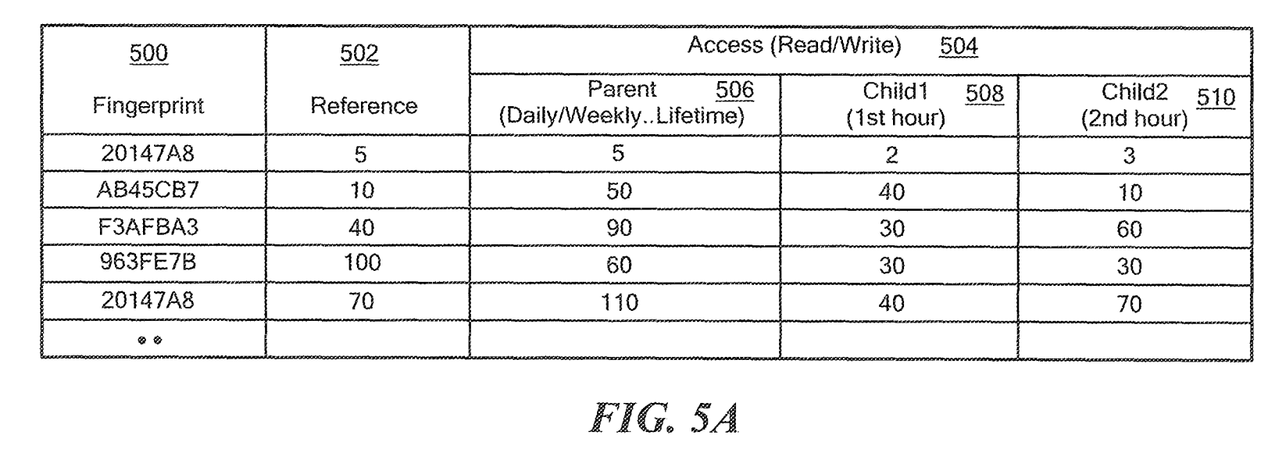
FIG. 5A is a tabular example of data priority information for a system according to an example embodiment of the disclosure.

FIG. 5A shows an example of parent-child access information that can be used for data priority according to an embodiment. In the example of FIG. 5A, content fingerprint 500 and reference information 502 are maintained, as well as access information 504, parent information 506, and first and second child information 508, 510. In embodiments, the reference information 502 can be incremented each time a data deduplication operation, for example, is performed, as well as a write to storage.

In an embodiment, the parent information 506 can correspond to a number of times a data block is accessed within a given time interval and/or for the lifetime of the fingerprint 500, after which it may be deleted. The first and second child access information 508, 510 can represent a subset of the parent information 506, such as a number of times a fingerprint was accessed for a pre-defined time period within the parent pre-determined time interval.

For example, a parent time interval can be set for one day, the first child access information 508 can be set to track on an hourly basis, such as a first hour of the parent time interval, and the second child access information 510 can be set to track a different hour, such as a second hour of the parent time interval. In the illustrated example, the parent time interval is two hours so that the access information of the parent 506 corresponds to a total of the accesses in the first and second child access counts 508, 510.

Figure 5B:
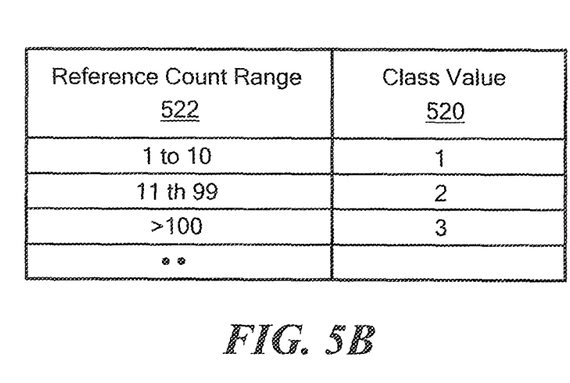
FIG. 5B is a tabular example of data priority information for a system according to an example embodiment of the disclosure.

As shown in FIG. 5B, a class value 520 can be set for a portion of a reference count range 522. In an embodiment, a reference count range of 1 to 10 can represent a class value of 1, a reference count range of 11 to 99 can represent class a value of 2 and so on. In embodiments, the class value may allow weighting of different references counts. For example, in the illustrated embodiment, higher reference counts, e.g., 300, which is >100, may be weighted more heavily than a lower reference count, e.g., 5. In addition, by apportioning the reference counts into ranges, computation of the priority values (see, e.g., 614 in FIG. 6) may be simplified.

Figure 6:
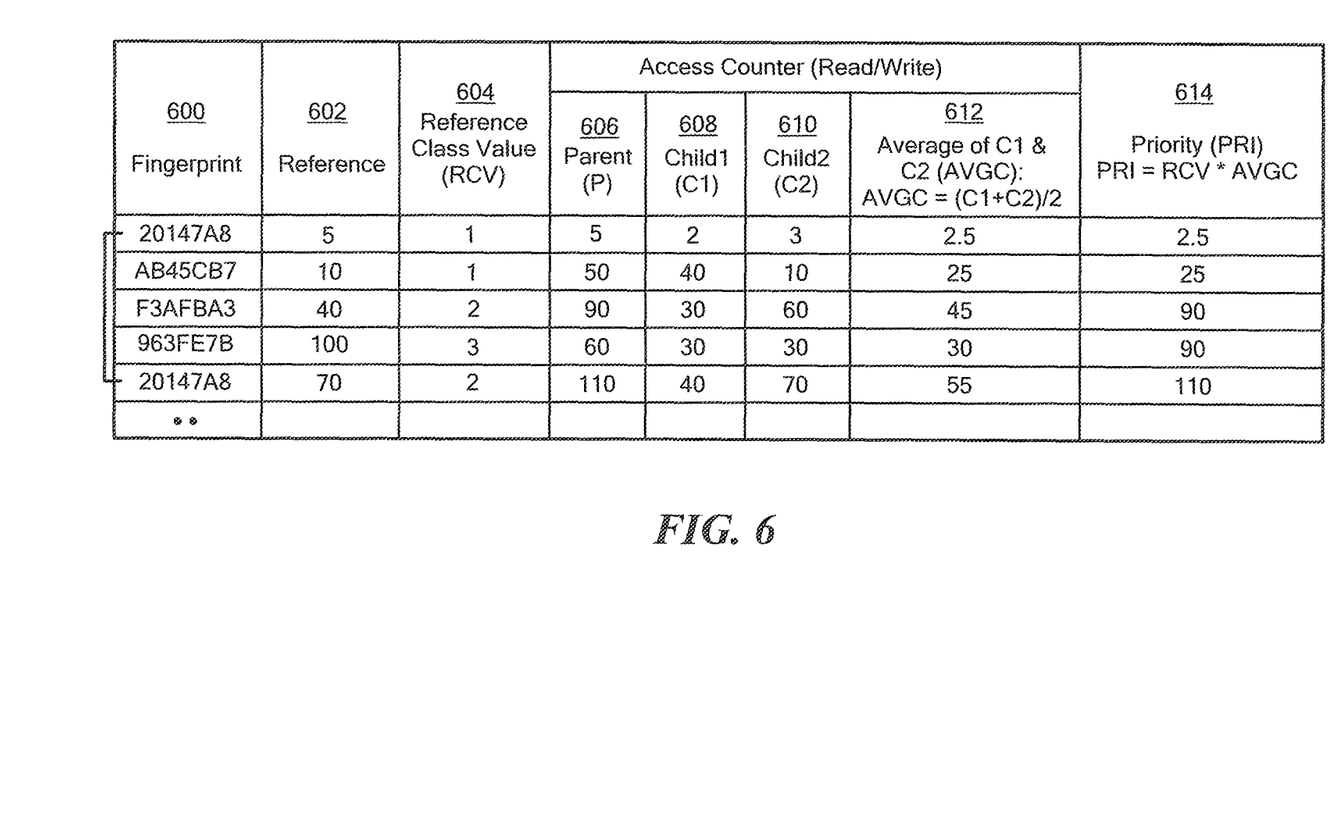
FIG. 6 is a tabular example of further data priority information for a system according to an example embodiment of the disclosure.

FIG. 6 shows data priority being generated for an example having parent and child access information. In the illustrated example, a content fingerprint 600 has associated reference information 602 and reference class value (RCV) information 604, an example of which is set forth above. The illustrated example also can have parent reference information 606 with corresponding first and second child information 608, 610. As noted above, a time interval for the parent can be divided into first and second time intervals corresponding to the first and second child information 608, 610. The first and second child access information 608, 610 can sum to the parent access information 606.

The first and second child access information 608, 610 can be averaged to determine a child access average 612, which can be used to generate a priority 614 for the content fingerprints 600.

The class value 604 obtained for the fingerprint 600 can be multiplied with the average value of at least a portion of the fingerprint first and second child access information 608, 610 to obtain the priority 614. An example computation is set forth below:

Priority=Reference Class Value*((Child1+ Child2+ . . . +Child$n$)/$n$)

Where n=2:

Priority=Reference Count Class Value*((Child1+ Child2)/2)

In the example of FIG. 6, a first instance of content fingerprint 20147A8 has reference information value of 5. The system performs a lookup, such as described above, to obtain the corresponding class value of 1, which is multiplied with the average value of the first and second child access information to determine the priority value. For fingerprint 20147A8, this can be computed as 1*((2+3)/2)=2.5. As is also shown, information for the content fingerprint can change over time. For example, a second instance of content fingerprint 20147A8 can have a priority of 110.

Figure 7A:
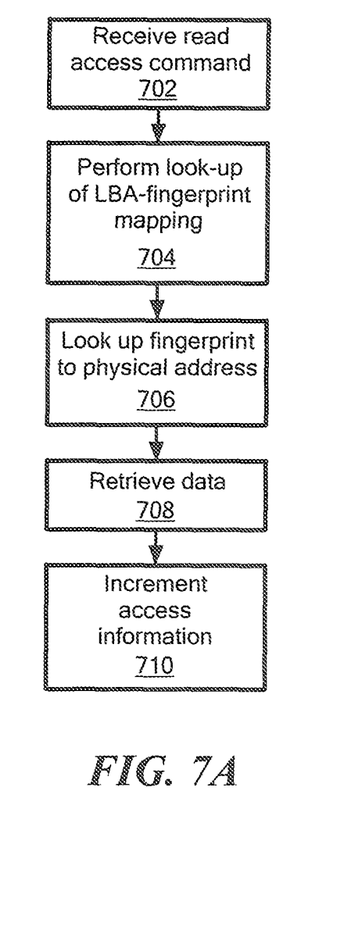
FIG. 7A shows an example process for a read command that may provide content-based data prioritization in accordance with embodiments of the disclosure.

FIG. 7A shows an example process for a read command that may provide content-based data prioritization in accordance with embodiments of the disclosure. In step 700, a read command may be received. In step 704, the LBA to fingerprint mapping may be used to determine an address for the data block. In step 706, the content fingerprint may be used to determine the physical address of the stored data block in physical storage. In step 708, the data may be retrieved and in step 710 the access reference information may be modified, such as incremented.

Figure 7B:
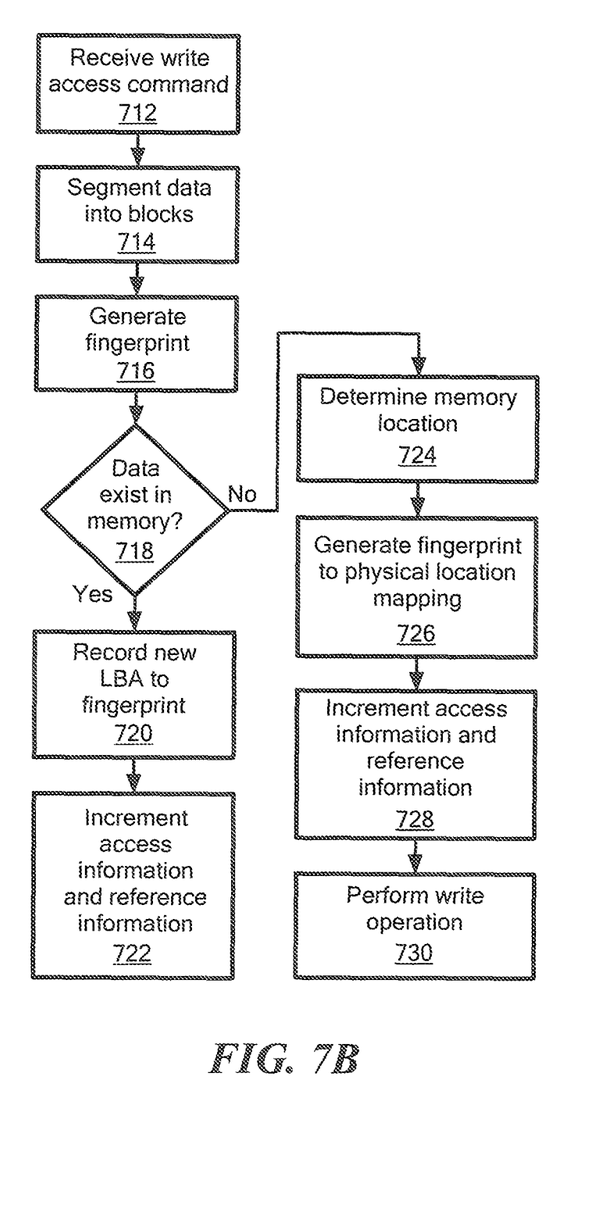
FIG. 7B shows an example process for a write command that may provide content-based data prioritization in accordance with embodiments of the disclosure.

FIG. 7B shows an example process for a write command that may provide content-based data prioritization in accordance with embodiments of the disclosure. In step 712, a write command is received and in step 714, the data stream may be segmented into data blocks. In step 716, a hash may be computed for the data block(s) to generate a unique identifier, e.g., content fingerprint, for the data block(s). In step 718, the existing content fingerprints may be examined and determined whether the data in the data block exists in storage. If so, a new LBA to fingerprint mapping may be recorded in step 720. In step 722, the write reference information and the access reference information may be incremented.

It is understood that the access and write reference information can be adjusted in any practical way, such as incrementing by one. In other embodiments, the information can be adjusted by any suitable value to meet the needs of a particular application.

If the data was determined in step 718 not to exist in storage, in step 724, a location derived from the content fingerprint may be generated and in step 726 a fingerprint to physical storage location may be mapped. In step 728, the write reference information may be incremented and the access reference information may be incremented. In step 730, the write to storage may be performed.

Figure 8:
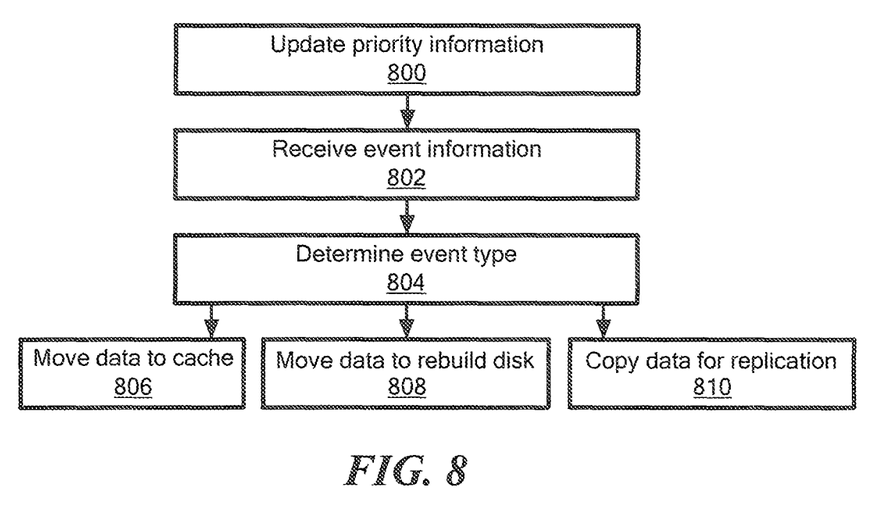
FIG. 8 is a flow diagram illustrating a method of using data priority information according to example embodiment of the disclosure.

FIG. 8 shows an example process to generate priority information using time-based data access in accordance with example embodiments. In step 800, the write reference information, the access information, time, and/or timestamp information may be used to determine/update a priority for each of the data blocks. In step 802, an event requiring manipulation of data may be received. In step 804, the type of event may be determined. In step 806, data can be moved to cache, in step 808 data can be moved to rebuild a disk, and in step 810 data can be copied for replication. The updated priority information for the data blocks can be used to generate an order for access to the data blocks for the particular event. For example, as described above, data can be moved to cache based upon priority information and time-based access information. In embodiments, priority information can be computed differently for different event types.

Figure 9:
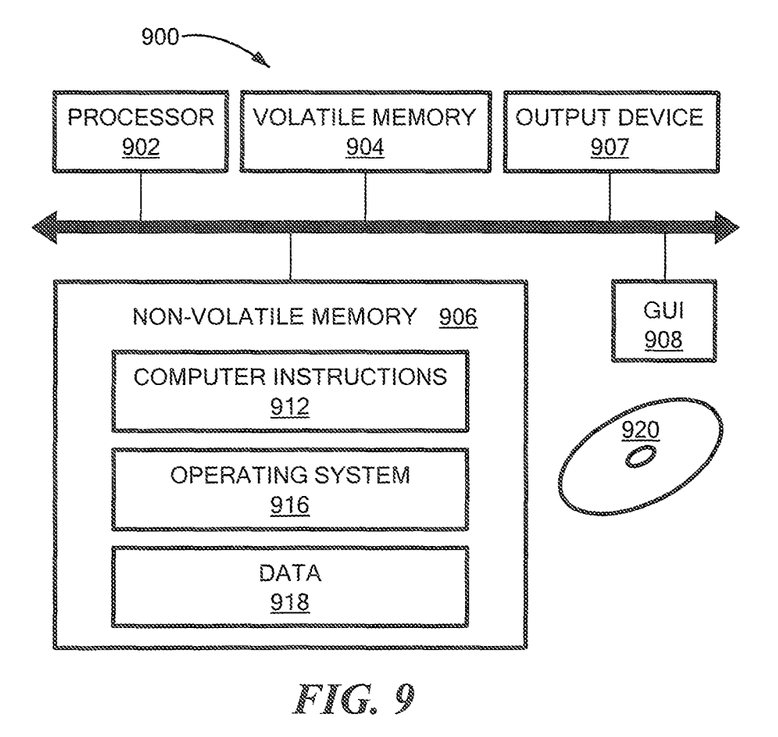
FIG. 9 is a block diagram of an illustrative computer that can perform at least a portion of the processing described herein.

FIG. 9 shows an exemplary computer 900 (e.g., physical or virtual) that can perform at least part of the processing described herein. The computer 900 includes a processor 902, a volatile memory 904, a non-volatile memory 906 (e.g., hard disk or flash), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety. Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
receiving read and write commands having addressing to physical storage based upon unique identifiers derived from content of data blocks associated with the write and read commands;
modifying access information for the respective data blocks associated with each of the read commands;
modifying write reference information for respective data blocks associated with each of the write commands;
storing time information for the respective data blocks;
determining respective priority information for the data blocks from the access information, the write reference information; and the time information; and
manipulating the data in the data blocks based upon the priority information for the data blocks.

2. The method according to claim 1, further including associating timestamp information with the data blocks.

3. The method according to claim 2, further including moving ones of the data blocks to cache memory based upon the priority information of the data blocks.

4. The method according to claim 3, further including moving ones of the data blocks to the cache memory based upon the priority information and the timestamp information associated with the data blocks.

5. The method according to claim 1, further including moving data from ones of the data blocks to rebuild a disk based upon the priority information.

6. The method according to claim 1, further including moving data from ones of the data blocks for replication based the priority information.

7. The method according to claim 1, further including:
associating timestamp information with the data blocks; and
moving ones of the data blocks to cache memory based upon the priority information and historical time-of-day based access.

8. The method according to claim 1, wherein the time information includes time interval information.

9. The method according to claim 8, further including modifying the access information for an associated data block if the time interval for the associated data block expires.

10. The method according to claim 1, further including modifying the write reference information for data deduplication for at least one of the write commands.

11. The method according to claim 1, further including weighting the access information, the write reference information, and/or the time information.

12. The method according to claim 1, further including modifying the access information for the respective data blocks associated with each of the write commands.

13. An article, comprising:
a non-transitory computer-readable medium having stored instructions that enable a machine to:
receive read and write commands having addressing to physical storage based upon unique identifiers derived from content of data blocks associated with the write and read commands;
modify access information for the respective data blocks associated with each of the read commands;
modify write reference information for respective data blocks associated with each of the write commands;
store time information for the respective data blocks;
determine respective priority information for the data blocks from the access information, the write reference information; and the time information; and
manipulate the data in the data blocks based upon the priority information for the data blocks.

14. The article according to claim 13, further including instructions to associate timestamp information with the data blocks.

15. The article according to claim 14, further including instructions to move ones of the data blocks to cache memory based upon the priority information of the data blocks.

16. The article according to claim 14, further including instructions to move ones of the data blocks to the cache memory based upon the priority information and the timestamp information associated with the data blocks.

17. The article according to claim 14, further including instructions to:
associate timestamp information with the data blocks; and
move ones of the data blocks to cache memory based upon the priority information and historical time-of-day based access.

18. The article according to claim 13, wherein the time information includes time interval information.

19. A system, comprising:
a processor; and
a non-transitory memory having stored instructions that when executed on the processor cause the processor to:
receive read and write commands having addressing to physical storage based upon unique identifiers derived from content of data blocks associated with the write and read commands;
modify access information for the respective data blocks associated with each of the read commands;
modify write reference information for respective data blocks associated with each of the write commands;
store time information for the respective data blocks;
determine respective priority information for the data blocks from the access information, the write reference information; and the time information; and
manipulate the data in the data blocks based upon the priority information for the data blocks.

20. The system according to claim 19, wherein the memory further includes stored instructions to cause the processor to move ones of the data blocks to cache memory based upon the priority information of the data blocks.

* * * * *